(12) United States Patent
Koh et al.

(10) Patent No.: US 12,164,336 B2
(45) Date of Patent: Dec. 10, 2024

(54) ELECTRONIC DEVICE COMPRISING FLEXIBLE DISPLAY

(71) Applicant: LG ELECTRONICS INC., Seoul (KR)

(72) Inventors: Ah Rah Koh, Seoul (KR); Hak Ho Choi, Seoul (KR); Seong Cheol Lee, Seoul (KR); Sung Do Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 196 days.

(21) Appl. No.: 17/792,125

(22) PCT Filed: Jan. 9, 2020

(86) PCT No.: PCT/KR2020/000380
§ 371 (c)(1),
(2) Date: Jul. 11, 2022

(87) PCT Pub. No.: WO2021/141162
PCT Pub. Date: Jul. 15, 2021

(65) Prior Publication Data
US 2023/0102896 A1    Mar. 30, 2023

(51) Int. Cl.
*G06F 1/16* (2006.01)
(52) U.S. Cl.
CPC .......... *G06F 1/1652* (2013.01); *G06F 1/1624* (2013.01); *G06F 1/1643* (2013.01); *G06F 1/1656* (2013.01); *G06F 1/1677* (2013.01)
(58) Field of Classification Search
CPC .... G06F 1/1624; G06F 1/1643; G06F 1/1652; G06F 1/1656; G06F 1/1677
See application file for complete search history.

(56) References Cited

U.S. PATENT DOCUMENTS 6,671,011 B1 * 12/2003 Zhang .................. G06F 1/1601
  349/12
7,463,238 B2 * 12/2008 Funkhouser ............ G06F 21/32
  345/905

(Continued)

FOREIGN PATENT DOCUMENTS

KR    1020110082943    7/2011
KR    1020140003132    1/2014

(Continued)

OTHER PUBLICATIONS

European Patent Office Application Serial No. 20913050.9, Search Report dated Sep. 13, 2023, 9 pages.

(Continued)

*Primary Examiner* — Adrian S Wilson
(74) *Attorney, Agent, or Firm* — LEE, HONG, DEGERMAN, KANG & WAIMEY

(57) ABSTRACT

The present disclosure provides an electronic device, including a flexible display, a frame part configured to support the flexible display and comprise a first frame and a second frame disposed so as to be slidable with respect to the first frame, a driving part configured to change a shape of the flexible display based on a relative position between the first frame and the second frame, and a controller, wherein the controller performs a designated operation in response to reception of an input signal. Other example embodiments are possible.

15 Claims, 20 Drawing Sheets

(56) References Cited

U.S. PATENT DOCUMENTS

| | | | | |
|---|---|---|---|---|
| 10,082,833 B2* | 9/2018 | Chen | ................... | G06F 1/1652 |
| 2006/0061541 A1* | 3/2006 | Ou | ................... | G06F 1/1652 |
| | | | | 345/107 |
| 2009/0231307 A1* | 9/2009 | Lee | ................... | G06F 1/1652 |
| | | | | 345/184 |
| 2013/0278522 A1* | 10/2013 | Kim | ................... | G06F 1/1652 |
| | | | | 345/173 |
| 2014/0176421 A1 | 6/2014 | Chen | | |
| 2016/0202781 A1 | 7/2016 | Kim et al. | | |
| 2018/0077808 A1 | 3/2018 | Seo et al. | | |
| 2021/0044683 A1 | 2/2021 | He et al. | | |

FOREIGN PATENT DOCUMENTS

| | | |
|---|---|---|
| KR | 1020140123725 | 10/2014 |
| KR | 1020160079443 | 7/2016 |
| WO | 2019153818 | 8/2019 |

OTHER PUBLICATIONS

PCT International Application No. PCT/KR2020/000380, International Search Report dated Sep. 18, 2020, 4 pages.

* cited by examiner

ELECTRONIC DEVICE COMPRISING FLEXIBLE DISPLAY

CROSS-REFERENCE TO RELATED APPLICATIONS

This application is the National Stage filing under 35 U.S.C. 371 of International Application No. PCT/KR2020/000380, filed on Jan. 9, 2020, the contents of which are all incorporated by reference herein in their entireties.

TECHNICAL FIELD

This disclosure relates an electronic device including a flexible display.

BACKGROUND ART

Recently, with developments of digital technologies, various types of electronic devices such as a mobile communication terminal, a smartphone, a tablet personal computer (PC), a notebook, a personal digital assistant (PDA), a wearable device, or a digital camera are widely used.

As the performance of the electronic device is improved, the demand for a large-screen display capable of more efficiently providing various functions is increasing. Meanwhile, electronic devices are required to be miniaturized and thinned for easy of portability, and this is in conflict with an electronic device having a large-screen display.

Accordingly, there are studies for electronic devices of a type in which at least a portion of a display is folded or rolled when carried around and the folded or rolled display may be unfolded only when necessary, by utilizing flexible displays with sufficient elasticity (for example, foldable displays and rollable displays).

DISCLOSURE OF INVENTION

Technical Goals

An electronic device including a flexible display may need to change and provide a display form to match a user situation or a user's intention.

For example, the electronic device may improve usability by receiving a user input in various ways in consideration of the structural characteristics of the flexible display and providing a function related to changing the display shape.

Furthermore, when a shock is applied to the electronic device while the shape of the flexible display is being changed, there may be a greater risk of damage than when a shock is applied to the electronic device while the shape of the display is not being changed, and thus appropriate motion control may be required.

Various example embodiments of the present disclosure are to provide improved usability of an electronic device including a flexible display.

Technical Solutions

According to an aspect of the electronic device according to the various example embodiments for achieving the above or other objects, there is provided an electronic device, including a flexible display, a frame part configured to support the flexible display and include a first frame and a second frame disposed so as to be slidable with respect to the first frame, a driving part configured to change a shape of the flexible display based on a relative position between the first frame and the second frame, and a controller that is configured to determine whether an input signal is received while the shape of the flexible display is changed by the driving part, and in response to reception of the input signal, perform a designated operation by using the driving part.

For example, changing the shape of the flexible display may include expanding or reducing a space of the flexible display facing a first surface of the electronic device.

For example, the driving part may expand or reduce a space of the flexible display facing the first surface by moving a position of an area in which the flexible display is rolled, folded or bent.

For example, the controller may control the driving part to stop changing the shape of the flexible display based on a type of the input signal.

For example, the controller may control the driving part to expand or reduce a space of the flexible display facing the first surface of the electronic device based on a type of the input signal.

For example, the controller, when the input signal is received while the space of the flexible display facing the first surface is expanded, may control the driving part to reduce the space, and when the input signal is received while the space is reduced, may control the driving part to expand the space.

For example, the second frame may further include a bumper member on a side facing in a direction opposite to the first frame.

For example, the controller may determine whether an input signal according to pressure on the bumper member is received, and control the driving part to perform the designated operation according to reception of the input signal.

For example, the controller may perform an operation corresponding to a position pressurized on the bumper member, and the controller may determine whether the input signal is received through at least one of a sensor, a mechanical key and a partial area of the flexible display, provided in the electronic device.

For example, the controller may perform the designated operation based on receiving an input signal related to a collision of the electronic device.

According to another aspect, there is also provided an electronic device including a flexible display, a frame part including a first frame configured to support at least a portion of the flexible display and a second frame configured to move relative to the first frame based on changing a shape of the flexible display, and a controller that is configured to perform a function related to the changing the shape of the flexible display based on whether an input signal is received.

For example, the electronic apparatus may further include at least one sensor, and the controller may determine whether an input signal generated according to a motion to the electronic device is received using the at least one sensor, and perform a function corresponding to a type of the input signal.

For example, the controller may acquire temperature information of the electronic device by using the at least one sensor, and based on whether the temperature information is within a designated range, perform a function corresponding to the type of the input signal.

For example, the frame part may further include a bumper member forming one side of the electronic device, and the controller may determine whether an input signal generated according to pressure on the bumper member is received through a switch provided inside the bumper member, and perform a function corresponding to a position pressurized on the bumper member.

Effects

According to various example embodiments, the electronic device may selectively expand or reduce a front area for outputting an image using a flexible display. Accordingly, it is possible to provide an electronic device that is easy-to-carry and has a large-screen display.

Further, by appropriately changing the display shape according to a usage situation or a user input, the possibility of damage to the electronic device may be minimized and improved usability may be provided.

BEST MODE FOR CARRYING OUT THE INVENTION

Figure 1:
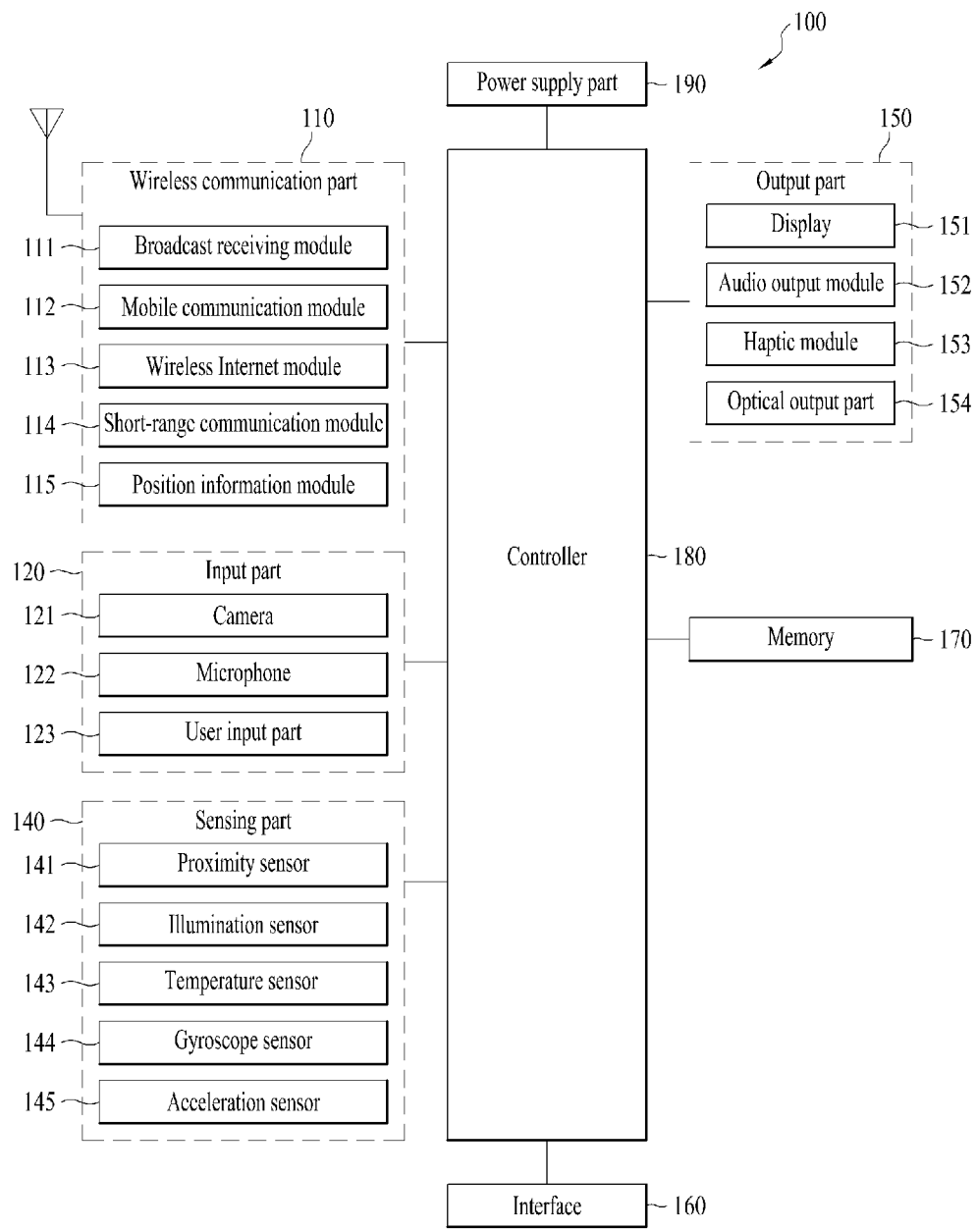
FIG. 1 is a block diagram of an electronic device according to various example embodiments of the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. Also, it should be noted that the accompanying drawings are merely illustrated to easily explain the concept of the invention, and therefore, they should not be construed to limit the technological concept disclosed herein by the accompanying drawings.

The terms 'first', 'second', etc. may be used to describe various components, but the components are not limited by such terms. The terms are used only for the purpose of distinguishing one component from other components.

When an arbitrary component is described as "being connected to" or "being linked to" another component, this should be understood to mean that still another component(s) may exist between them, although the arbitrary component may be directly connected to, or linked to, the corresponding other component. In contrast, when an arbitrary component is described as "being directly connected to" or "being directly linked to" another component, this should be understood to mean that no component exists between them.

A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

An electronic device according to various embodiments may include at least one of a mobile phone, a smartphone, a laptop computer, a digital broadcasting terminal, personal digital assistants (PDA), a portable multimedia player (PMP), a navigator, a slate PC, a tablet PC, an ultrabook, a wearable device (e.g., smartwatch), a smart glass, a head-mounted display (HMD), a digital TV, a desktop computer, or a digital signage.

FIG. 1 is a block diagram of an electronic device according to various example embodiments of the present disclosure.

Referring to FIG. 1, an electronic device 100 according to the various example embodiments may include at least one of a wireless communication part 110, an input part 120, a sensing part 140, an output part 150, an interface part 160, a memory 170, a controller 180 (or, a controller) and a power supply part 190.

The electronic device 100 according to the various example embodiments of the present disclosure may include other components in addition to the components illustrated in FIG. 1, or may include only some of the components illustrated in FIG. 1.

The wireless communication part 110 may include one or more modules that enable wireless communication between the electronic device 100 and the wireless communication system, wireless communication between the electronic device 100 and another electronic device (not illustrated) (for example, the electronic device 100), or wireless communication between the electronic device 100 and an external server. The wireless communication part 110 may include one or more modules that connect the electronic device 100 to one or more networks. For example, the wireless communication part 110 may include at least one of a broadcast receiving module 111, a mobile communication module 112, a wireless internet module 113, a short-range communication module 114 and a position information module 115.

The input part 120 may include at least one of an image input part for receiving an image signal input (for example, a camera 121), an audio input part for receiving an audio signal input (for example, a microphone 122) and a user input part 123 for receiving other user inputs. For example, the user input part 123 may receive a user touch input through a touch sensor (or a touch panel) provided in a display 151, or may receive a user input through a mechanical key. Information (for example, voice data and image data) collected from the input part 120 may be analyzed and processed as a user's control command.

The sensing part 140 may include one or more sensors for sensing at least one of information in the electronic device 100, surrounding environment information around the electronic device 100 and user information.

For example, the sensing part 140 may include at least one of a proximity sensor 141, an illumination sensor 142, a temperature sensor 143, a gyroscope sensor 144 and an acceleration sensor 145. In addition, the sensing part 140 may include at least one of a touch sensor, a finger scan sensor, a magnetic sensor, a gravity sensor (a G-sensor), a motion sensor, an RGB sensor, an infrared sensor (an IR sensor: infrared sensor), an ultrasonic sensor, an optical sensor, a battery gauge, an environmental sensor (for example, a barometer, a hygrometer, a thermometer, a radiation detecting sensor, a heat detecting sensor and a gas detecting sensor) and a chemical sensor (for example, an electronic nose, a healthcare sensor and a biometric sensor). Meanwhile, the electronic device 100 of the present disclosure may combine and utilize information sensed by at least two or more of the sensors.

The output part 150 may output information related to sight, hearing or touch. For example, the output part 150 may include at least one of the display 151, an audio output module 152, a haptic module 153 and an optical output part 154.

In an example embodiment, the display 151 may form a layered structure with the touch sensor, or may be integrally formed, to implement a touch screen that simultaneously provides a touch input function and a screen output function. For example, the touch screen not only may function as the user input part 123 that provides an input interface between the electronic device 100 and a user, but also may function as the output part 150 that provides an output interface between the electronic device 100 and a user.

Further, as the display 151 for outputting image information, the electronic device 100 according to the various example embodiments may include a flexible type display that may be rolled, bent or folded. For example, the flexible display may be manufactured on a thin and flexible substrate so that it may be curved, bent, folded, twisted or rolled like paper while having the screen output characteristics of existing flat panel displays.

For example, the flexible display may be combined with a touch sensor to implement a flexible touch screen. For example, the controller 180 may sense a touch input through the flexible touch screen of the flexible display, and may perform various functions corresponding to the touch input.

The electronic device 100 may further include a deformation detecting part (not illustrated) that may detect a change in the shape of the flexible display. For example, the electronic device 100 may detect a change in the shape of the flexible display through at least one element of the sensing part 140. For example, based on the change in the shape of the flexible display sensed through at least one of the deformation detecting part (not illustrated) or the sensing part 140, the controller 180 may change and output information displayed on the flexible display, or may generate a predetermined control signal.

For example, changing the shape of the flexible display may include changing a space of the flexible display viewed through a first surface (for example, a front surface) of the electronic device 100. For example, as a portion of the flexible display is curved, folded or warped, a space of an image output area of the flexible display facing the first surface of the electronic device 100 may be expanded or reduced.

The above-described shape change of the flexible display may occur based on an external force by a user, but is not limited thereto. For example, the electronic device 100 may automatically change the shape of the flexible display based on an input through the input part 120 or the sensing part 140 or a specific application command, and the electronic device 100 may further include a driving part for changing the shape of the display. For example, the electronic device 100 may expand or reduce the space of the flexible display viewed through the first surface by moving the position of the area where the flexible display is curled, folded or warped according to an operation of the driving part. The driving part may be driven under the control of the controller 180.

The audio output module 152 may output to the outside audio data received from the wireless communication part 110 in call signal reception, a call mode, a recording mode, a voice recognition mode or a broadcast reception mode, or audio data stored in advance in the memory 170. For example, the audio output module 152 may output an audio signal related to a function performed by the electronic device 100 (for example, a call-signal reception tone or a message reception tone). For example, the audio output module 152 may include at least one of a receiver, a speaker and a buzzer.

The haptic module 153 may generate various tactile effects that a user may feel. A representative example of the tactile effect generated by the haptic module 153 may include vibration. The intensity and pattern of vibration generated through the haptic module 153 may be determined by a user's selection or setting of the controller 180. For example, the haptic module 153 may synthesize and output different vibrations or output the vibrations sequentially.

The optical output part 154 may output a signal for notifying the occurrence of an event by using light of a light source of the electronic device 100. For example, the event generated in the electronic device 100 may include at least one of message reception, call signal reception, missed call, alarm, schedule notification, e-mail reception and information reception through an application.

The interface part 160 may serve as a passage with various types of external devices connected to the electronic device 100. For example, the interface part 160 may include at least one of a wired/wireless headset port, an external charger port, a wired/wireless data port, a memory card port, a port for connecting a device equipped with an identification module, an audio input/output (I/O) port, a video I/O port and an earphone port. In response to an external device being connected to the interface part 160, the electronic device 100 may perform a specific function related to a connected external device or control the external device.

The memory 170 may store data related to various functions of the electronic device 100. For example, the memory 170 may store a plurality of application programs (or applications) driven in the electronic device 100, data for operations of the electronic device 100 and commands. For example, at least some of the application programs may be downloaded from an external server through wireless communication. Or, for another example, at least some of the application programs may be stored in advance in the memory 170 for a specific function (for example, an incoming call, a call out function, or a message receiving function, or a message sending function) of the electronic device 100. An application program stored in the memory 170 may be driven to perform a predetermined operation (or a function) of the electronic device 100, for example, based on the controller 180.

The controller 180 may control the overall operation of the electronic device 100. For example, the controller 180 may process signals, data and information input or output through components of the electronic device 100, or by driving an application program stored in the memory 170, the controller 180 may provide a user with information or process a specific function.

For example, in order to drive an application program stored in the memory 170, the controller 180 may control at least some of the components of the electronic device 100 illustrated in FIG. 1. In order to drive the application program, the controller 180 may operate at least two or more of the components included in the electronic device 100 together.

The power supply part 190 may supply power to each component included in the electronic device 100 by receiving external or internal power based on the control of the controller 180. The power supply part 190 may include a battery. The battery may include a built-in battery or a removable battery.

At least some of the respective components of the above-described electronic device 100 may operate in cooperation with each other to implement an operation, control and a controlling method of the electronic device 100 according to various example embodiments described below. Further, the operation, the control and the controlling method of the electronic device 100 may be implemented by driving at least one application program stored in the memory 170.

The electronic device 100 according to the various example embodiments of the present disclosure may have a bar shape. However, the electronic device 100 is not limited to the shape, and the electronic device 100 may have various shapes within a range that does not contradict the features of the present disclosure.

Figure 2A:
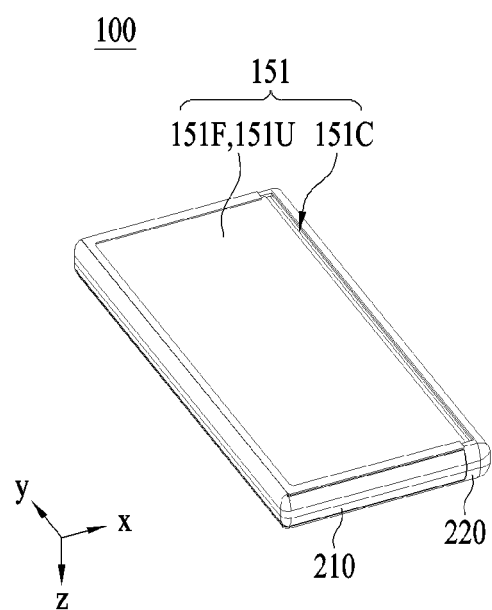
FIG. 2A is a front perspective view of an electronic device according to an example embodiment of the present disclosure.
Figure 2B:
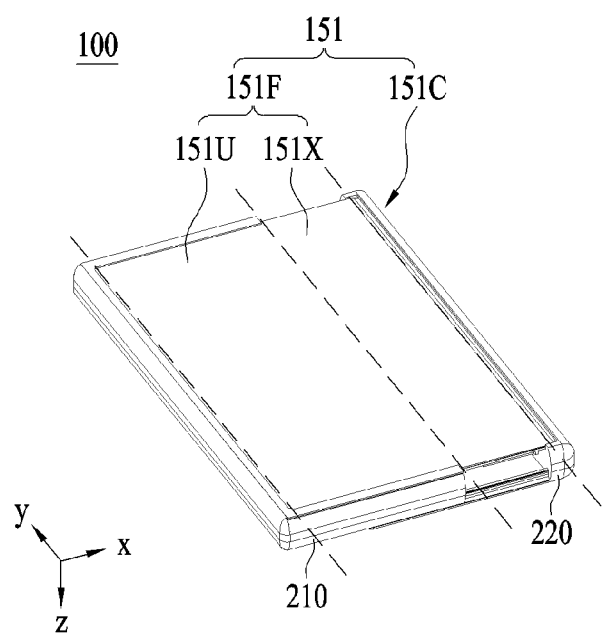
FIG. 2B is a front perspective view of an electronic device according to an example embodiment of the present disclosure.
Figure 2C:
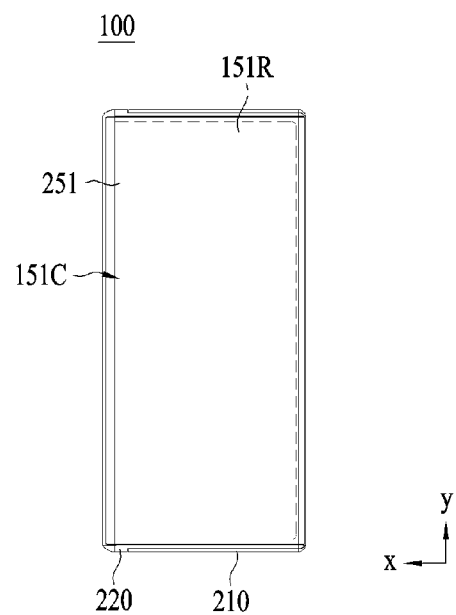
FIG. 2C is a rear view of an electronic device according to an example embodiment of the present disclosure.
Figure 2D:
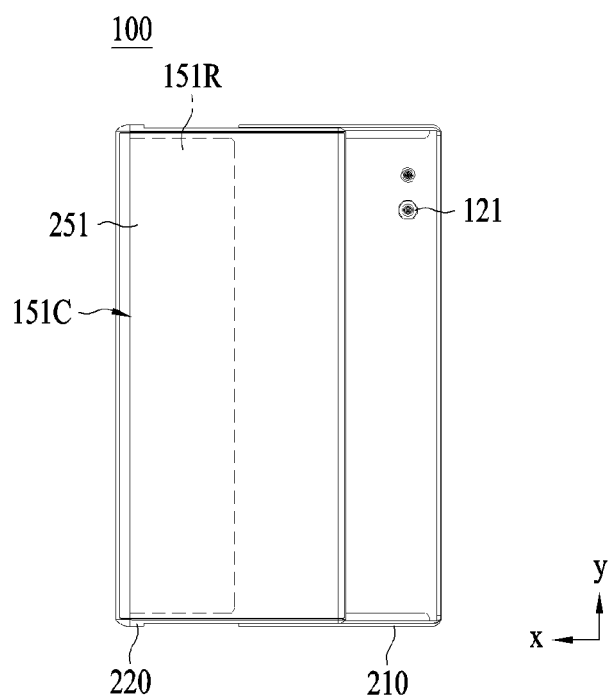
FIG. 2D is a rear view of an electronic device according to an example embodiment of the present disclosure.

FIGS. 2a and 2b are front perspective views of the electronic device 100 according to example embodiments of the present disclosure, and FIGS. 2c and 2d are rear views of the electronic device 100 of FIGS. 2a and 2b.

Figure 3A:
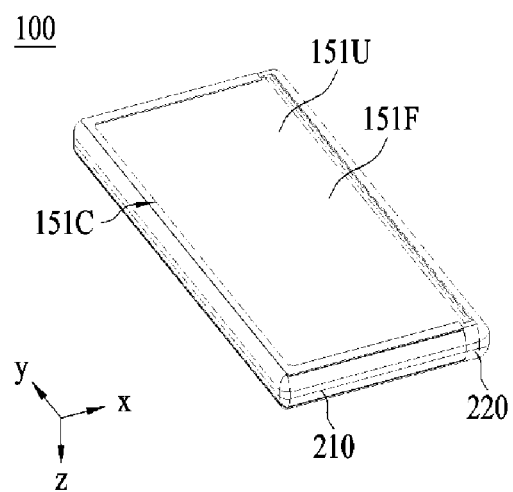
FIG. 3A is a front perspective view of an electronic device according to an example embodiment of the present disclosure.
Figure 3B:
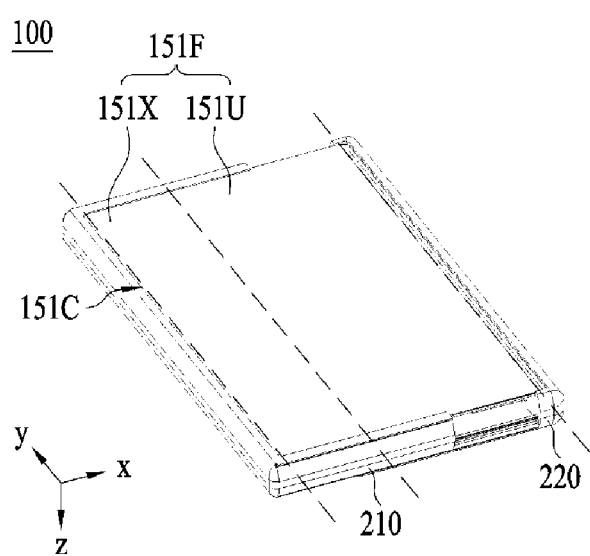
FIG. 3B is a front perspective view of an electronic device according to an example embodiment of the present disclosure.
Figure 3C:
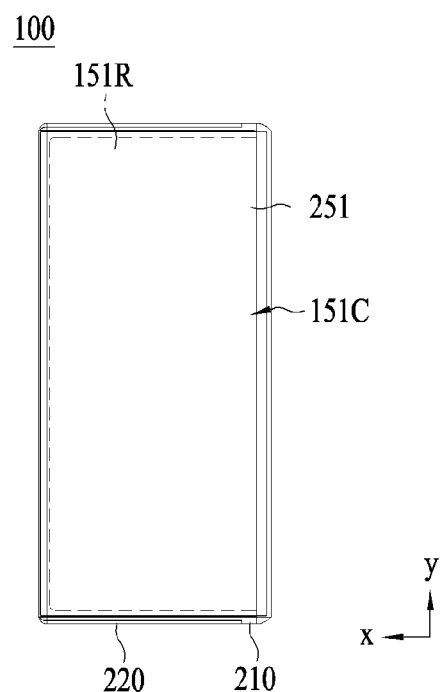
FIG. 3C is a rear view of an electronic device according to an example embodiment of the present disclosure.
Figure 3D:
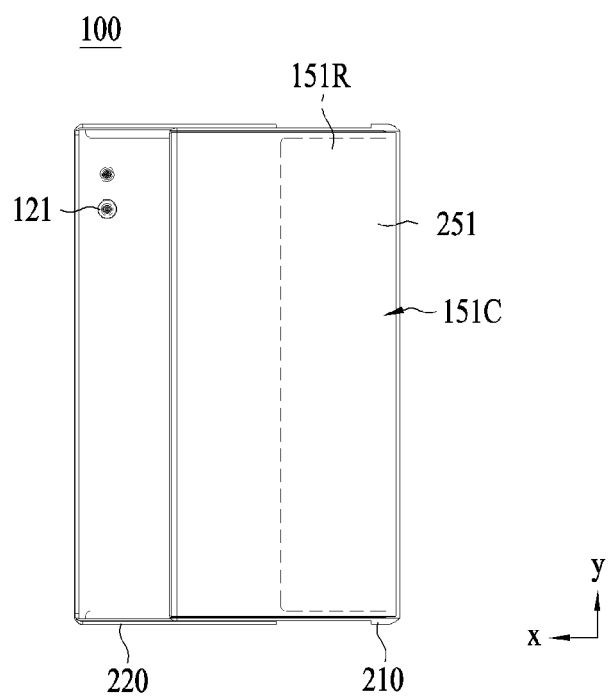
FIG. 3D is a rear view of an electronic device according to an example embodiment of the present disclosure.

FIGS. 3a and 3b are front perspective views of the electronic device 100 according to other example embodiments of the present disclosure, and FIGS. 3c and 3d are rear views of the electronic device 100 of FIGS. 3a and 3b.

Referring to FIGS. 2a to 3d, the electronic device 100 according to the various example embodiments may include the display 151 that is a flexible type that may expand or reduce an image output area viewed through the first surface of the electronic device 100, or an area of the display 151 facing the first surface (for example, a first area 151F).

For example, as a partial area (for example, a third area 151C) of the display 151 is rolled, folded or bent and a position of the area that is rolled, folded or bent is changed, a space of the display 151 facing the first surface of the electronic device 100 may be expanded or reduced.

For example, the display 151 may include the first area 151F facing the first surface (for example, a front surface) of the electronic device 100, a second area 151R facing a second surface (for example, a rear surface) of the electronic device 100, and the third area 151C positioned between the first area 151F and the second area 151R.

The first area 151F may include an area of the display 151 that is viewed on the first surface (for example, the front surface) of the electronic device 100.

The second area 151R may include an area of the display 151 that is viewed through the second surface (for example, the rear surface) of the electronic device 100.

For example, the first area 151F may include a fixed area 151U and a variable area 151X. The fixed area 151U may correspond to the area of the display 151 viewed from the first surface of the electronic device 100 even when the first area 151F is minimized. The variable area 151X may correspond to an area of the display 151 that is additionally viewed on the first surface of the electronic device 100 as the first area 151F is expanded. The space of the variable area 151X may vary according to the extent to which the position of the third area 151C that is rolled, bent or folded in the display 151 is moved.

The electronic device 100 according to the various example embodiments may include an element (for example a driving part and a frame part) for moving a rolling, bending or folding area of the display 151.

For example, the electronic device 100 may include a driving part (not illustrated) that may move the position in which the third area 151C of the display 151 is rolled, bent or folded.

The driving part (not illustrated) may expand or reduce the space of the flexible display 151 facing one surface (for example, the first surface) of the electronic device 100. For example, the driving part (not illustrated) may draw out a partial area (for example, the second area 151R) of the display 151 facing the second surface of the electronic device 100 to position the area to face the first surface, or may insert a partial area (for example, the first area 151F) of the display 151 facing the first surface and position the area to face the second surface.

The driving part (not illustrated) may be disposed adjacent to the third area 151C. For example, the driving part (not illustrated) is disposed near the third area 151C located on the right side when viewed from the first surface of the electronic device 100 as illustrated in FIGS. 2a to 2d, and may move the third area 151C, that is, a position where the display is rolled, folded or bent. For another example, the driving part (not illustrated), as illustrated in FIGS. 3a to 3d, is disposed so that the driving part (not illustrated) is adjacent to the third area 151C located on the left side with respect to the first surface of the electronic device 100, and may move the position of the third area 151C.

Further, the electronic device 100 is a frame part for supporting the display 151 and other internal components of the electronic device 100, and may include a first frame 210 and a second frame 220. The first frame 210 and the second frame 220 may be arranged to be slidable toward or away from each other.

The frame part may support the display 151 regardless of a change in the shape of the display 151 according to a relative movement between the first frame 210 and the second frame 220.

For example, the second frame 220 may move relative to the first frame 210 in response to a change in the shape of the display 151. As the second frame 220 moves relative to the first frame 210, the space of the first area 151F or the second area 151R of the display 151 may increase or decrease.

For example, as the second frame 220 moves relative to the first frame 210 by sliding in the direction away from the first frame 210 (for example, in the positive direction of the x-axis), a display portion of the third area 151C or the second area 151R may be drawn out to the first surface (for example, the front surface) as the variable area 151X of the first area 151F. In this case, the space of the first area 151F may be expanded and the space of the second area 151R may be reduced.

Conversely, when the second frame 220 is relatively moved in the direction (for example, in the negative direction of the x-axis) closer to the first frame 210, the variable area 151X is rolled into the second surface (for example, the rear surface) of the electronic device 100, and accordingly, the first area 151F may be reduced and the second area 151R may be expanded. For example, when the first area 151F is in the reduced state as described above, the first frame 210 and the second frame 220 may be positioned so that substantial portions thereof overlap.

In the electronic device 100 according to the example embodiment, as illustrated in FIGS. 2a to 2d, the first frame 210 may be positioned to correspond to the fixed area 151U and support the fixed area 151U, and the second frame 220 may be positioned to correspond to the variable area 151X and support the variable area 151X.

In contrast, in the electronic device 100 according to another example embodiment, as illustrated in FIGS. 3a to 3d, the first frame 210 may be positioned to correspond to the variable area 151X and support the variable area 151X, and the second frame 220 may be positioned to correspond to the fixed area 151U and support the fixed area 151U.

Meanwhile, the third area 151R may be externally viewed on the second surface (for example, the rear surface) of the electronic device 100 through a rear window 251 having a light transmission characteristic. For example, the electronic device 100 may output determined image information through the third area 151R on the second surface of the electronic device 100.

According to the example embodiment, the electronic device 100 may include at least one camera 121 on the rear surface of the first frame 210 (see FIG. 2d) or on the rear surface of the second frame 220 (see FIG. 3d).

As described above, when the second frame 220 slides in a direction away from the first frame 210, the space of the third area 151R facing the second surface of the electronic device 100 may be reduced while at least a portion of the second frame 220 overlapping the first frame 210 may be exposed to the outside. The camera 121 positioned in the first frame 210 (see FIG. 2d) or the second frame 220 (see FIG. 3d) may be exposed to the outside through a portion of a frame part according to the sliding movement. A user may perform photography using the camera 121 on the second surface of the electronic device 100 in a state in which the first area 151F facing the first surface of the display is expanded.

Figure 4:
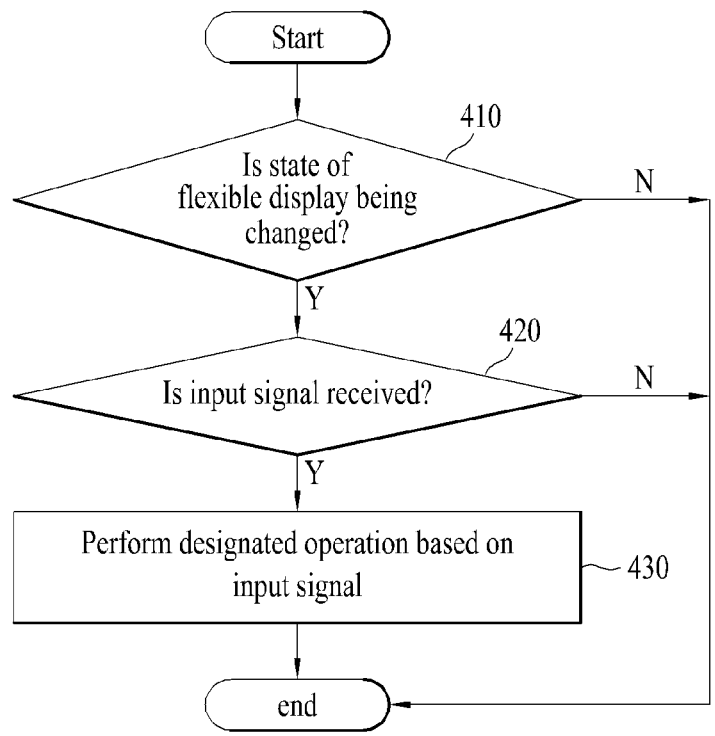
FIG. 4 is a flowchart illustrating an operation of an electronic device according to an example embodiment of the present disclosure.

FIG. 4 is a flowchart illustrating a driving operation of an electronic device according to an example embodiment of the present disclosure.

Referring to FIG. 4, the electronic device 100 according to the various example embodiments (for example, the controller 180) may determine whether the state (or the shape) of the display 151 is being changed in operation 410.

The display 151 is a flexible display having a flexible characteristic, and a size of an area of the display 151 facing the first surface of the electronic device 100 may be changed. The state change of the display 151 may be automatically performed by a driving part (not illustrated), or may be manually performed by an external force.

The controller 180 may determine whether the state (or the shape) of the display 151 is being changed by the driving part in operation 410.

When the controller 180 determines that the state of the display 151 is being changed, the electronic device 100 (for example, the controller 180) may determine whether an input signal is received in operation 420.

For example, the controller 180 may identify whether an input signal is received while the shape of the display 151 is being changed, by using at least one component of the input part 120 or the sensing part 140. For example, the controller 180 may acquire a user input signal or an input signal generated according to a motion to the electronic device 100 through at least one of the input part 120 and the sensing part 140.

When receiving a predetermined input signal during the state change of the display 151 in operation 420, the electronic device 100 may perform a designated operation based on the input signal in operation 430. For example, the designated operation may be determined based on the type of the input signal.

According to the various example embodiments, the designated operation may include performing a function related to changing the shape of the display 151. For example, the controller 180 may control the driving part to expand or reduce the space of the display 151 facing the first surface based on the input signal, or may control the driving part to stop the operation of expanding or reducing the space of the display 151, which is already in progress by the driving part.

For example, when an input signal is received while the space facing the first surface of the display 151 is being expanded by the driving part, the controller 180 may control the driving part to reduce the space according to the input signal.

For another example, when receiving an input signal while the space facing the first surface of the display 151 is being reduced, the controller 180 may control the driving part so that the space facing the first surface is expanded according to the input signal.

FIGS. 5a to 5f are diagrams for explaining methods of acquiring an input signal of an electronic device according to the various example embodiments of the present disclosure.

The electronic device 100 according to the various example embodiments may acquire (or receive) an input signal in various ways. In addition, the electronic device 100 may execute a function corresponding to the input signal based on the type of the acquired (or received) input signal. For example, the electronic device 100 may acquire the input signal using at least one of the input part 120 and the sensing part 140.

Figure 5A:
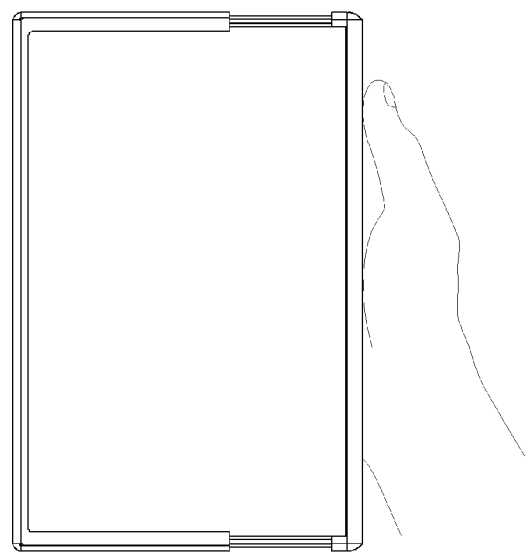
FIG. 5A is a diagram illustrating a method of receiving an input signal of an electronic device according to an example embodiment of the present disclosure.

Referring to FIG. 5*a*, the electronic device 100 according to the example embodiment may acquire an input signal according to a user's grip or a user's touch on a partial area of a side (for example, a right side). For example, the electronic device 100 may include at least one of a grip sensor, a proximity sensor, a touch sensor and a mechanical key, and by using the at least one sensor, the electronic device 100 may detect whether a touch (or hovering) occurs through an external object (for example, a user's thumb).

The electronic device 100 may distinguish and recognize various types of touch methods, and may generate various input signals based on the touch methods. The electronic device 100 may execute a predetermined function corresponding to a type of a generated input signal. For example, the type of touch may include at least one of a touch input, a double touch input and a long touch input. Further, in addition, a hovering input or a gesture input may be included.

For example, the electronic device 100 may receive a touch input from one side of the electronic device 100, and accordingly, the electronic device 100 may control the driving part to stop the ongoing shape change (for example, expansion or reduction) operation of the display 151.

Further, when the electronic device 100 repeatedly receives a touch input (for example, a double touch input) from one side within a predetermined time, the electronic device 100 may control the driving part to re-perform the shape change operation of display 151 that was performed before the operation of the driving part was stopped. For example, when the expansion operation is stopped by receiving a touch input while the display 151 is being expanded, the electronic device 100 may control the driving part so that the display 151 is expanded again as the double touch input is received.

Meanwhile, when a long touch input is received from one side of the electronic device 100, the electronic device 100 may control the driving part to perform an operation opposite to that of the previously performed shape change of the display 151. For example, a long touch input may be received while the display 151 is being expanded (or in a state in which the expansion operation is stopped while the display 151 is being expanded), and in this case, the electronic device 100 may control the operation of the driving part so that the display 151 is reduced.

Figure 5B:
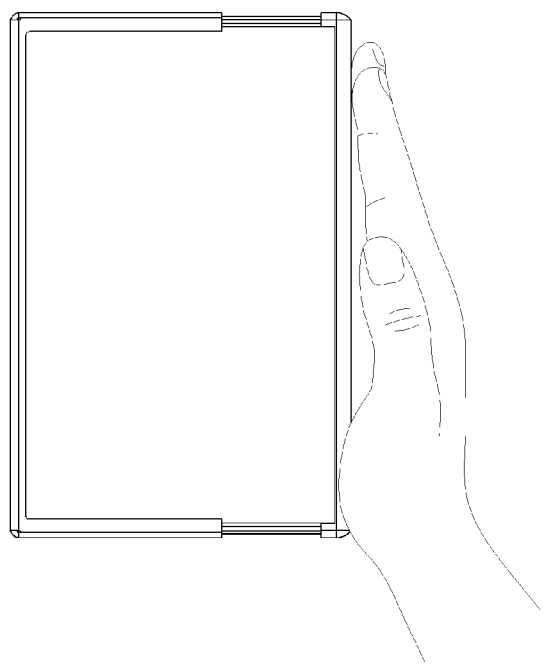
FIG. 5B is a diagram illustrating a method of receiving an input signal of an electronic device according to an example embodiment of the present disclosure.

Referring to FIG. 5*b*, the electronic device 100 may receive an input signal according to an external force that prevents the display 151 from being expanded while the display 151 is automatically expanded by a driving part.

For example, in a state in which the second frame of the electronic device 100 slides in a direction away from the first frame, a user may forcibly stop the expansion of the display 151 and the relative movement of the second frame, by pressing an outer portion of the second frame in a direction opposite to the moving direction of the second frame. Further, even when the display 151 cannot be expanded because the electronic device 100 is positioned between obstacles, an external force may act in a direction opposite to the expanding direction of the display 151 as described above.

The electronic device 100 according to the various example embodiments may acquire reception of an input signal that prevents expansion of the display 151, by using at least one sensor (for example, a proximity sensor, a pressure sensor, a touch sensor, a motion sensor or a thermal sensor) of the sensing part 140 provided on a side. Based on the input signal, the electronic device 100 may temporarily suspend the operation of the driving part for expanding the display 151 or may reduce the display 151 by driving in a direction opposite to the expansion direction.

Figure 5C:
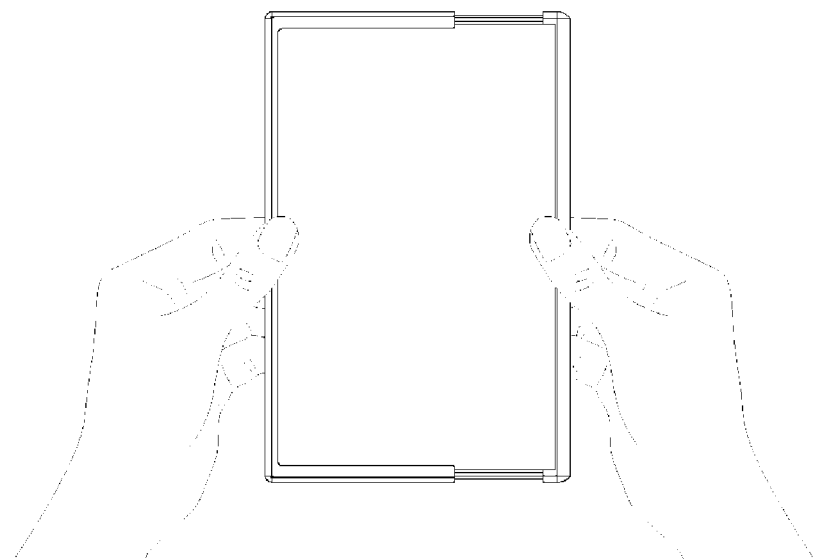
FIG. 5C is a diagram illustrating a method of receiving an input signal of an electronic device according to an example embodiment of the present disclosure.

Referring to FIG. 5*c*, while the display 151 is being automatically reduced, the electronic device 100 may receive an input signal generated according to an external force that prevents the display 151 from being reduced.

For example, using at least one sensor (for example, a touch sensor, a pressure sensor, a proximity sensor, a motion sensor or a thermal sensor), the electronic device 100 may sense generation of a user's grip or an external force for forcible sliding in a direction in which the display 151 is expanded, that is, the direction in which the first frame and the second frame move away from each other.

When receiving an input signal that prevents the reduction of the display 151 as described above, based on the input signal, the electronic device 100 may temporarily suspend the operation of the driving part for reducing the display 151 or may control the driving part so that the display 151 is expanded.

Meanwhile, according to another example embodiment, in a state in which the shape change of the display 151 is set to the automatic mode, even in a situation in which the display 151 is maintained in a certain shape, that is, in a situation in which the shape of the display 151 is not changed, the electronic device 100 may perform similarly based on reception of the input signal. For example, when the various types of input signals described above with reference to FIGS. 5*a* to 5*c* are received while the positions of the first frame and the second frame are constantly fixed, the electronic device 100 may recognize the signals as signals for expanding or reducing the display 151 and control the operation of the driving part.

According to the example embodiment, the electronic device 100 may acquire temperature information of the electronic device 100 by using a temperature sensor. For example, when a shape change of the display 151 is requested based on an input signal, the electronic device 100 may sense temperature information of the electronic device 100 using the temperature sensor. If it is determined that the temperature of the electronic device 100 falls within a designated range based on the temperature information, the electronic device 100 may control the driving part to perform an operation related to a shape change of the display 151. On the other hand, when it is determined that the temperature of the electronic device 100 does not fall within the designated range, instead of changing the shape of the display 151, the electronic device 100 may output a pop-up message for displaying a warning that a change in the shape of the display 151 is limited at the current temperature through the display 151.

Further, the electronic device 100 according to the various example embodiments may acquire an input signal related to a motion to the electronic device 100 by using at least one sensor (for example, a gyroscope sensor, an acceleration sensor, a G-sensor, and an optical sensor).

Figure 5D:
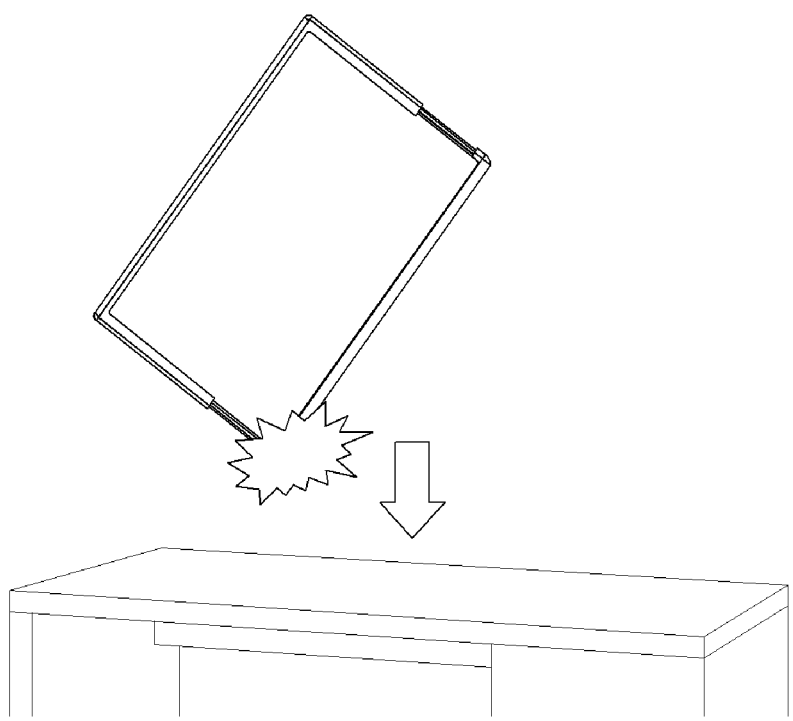
FIG. 5D is a diagram illustrating a method of receiving an input signal of an electronic device according to an example embodiment of the present disclosure.

For example, FIG. 5*d* illustrates a collision-detecting situation of the electronic device 100, and the electronic device 100 according to the various example embodiments may detect that the electronic device 100 is falling based on an acceleration state or a change in displacement of the electronic device 100, and may acquire an input signal corresponding thereto.

When the electronic device 100 receives the input signal related to the collision as described above while the display 151 is expanded or reduced by the driving part, the electronic device 100 may stop the operation of the driving part.

For example, when the electronic device 100 collides with an external object while the shape of the display 151 is being changed, the possibility of damage may be relatively greater than when the electronic device 100 collides in an otherwise state. The electronic device 100 according to the various example embodiments of the present disclosure may minimize damage to the electronic device 100 in a collision situation, by determining a collision detection situation in advance and stopping the operation of the driving part.

Figure 5E:
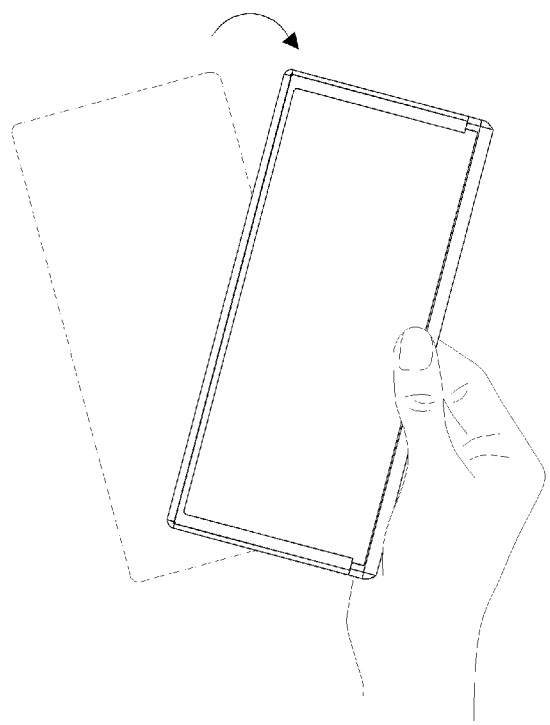
FIG. 5E is a diagram illustrating a method of receiving an input signal of an electronic device according to an example embodiment of the present disclosure.
Figure 5F:
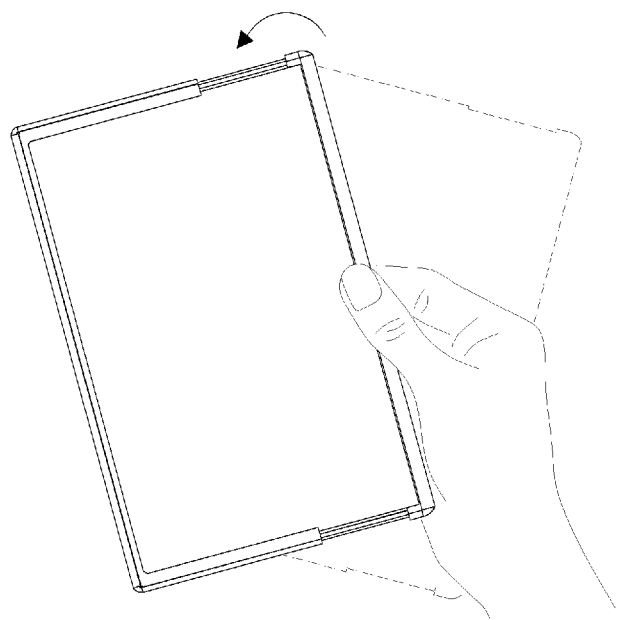
FIG. 5F is a diagram illustrating a method of receiving an input signal of an electronic device according to an example embodiment of the present disclosure.

Referring to FIGS. 5e and 5f, the electronic device 100 may identify a user input related to a change to the shape of the display 151 through an input signal related to a motion to the electronic device 100.

The electronic device 100 according to the various example embodiments may determine whether a designated motion occurred to the electronic device 100 by using at least the one of the gyroscope sensor, the acceleration sensor, the G-sensor and the optical sensor.

For example, the user may generate an acceleration motion to the electronic device 100, by gripping the electronic device 100 and using a wrist snap.

For example, as illustrated in FIG. 5e, the electronic device 100 may move with acceleration in one direction (for example, a moving direction of the second frame when the display 151 is expanded) in a state in which the display 151 is reduced, and may generate an input signal according to the motion. For example, the electronic device 100 may determine the input signal as a command for expanding the display 151, and control the driving part to expand the display 151.

For example, as illustrated in FIG. 5f, the electronic device 100 may move while being accelerated in one direction in a state that the display 151 is expanded, for example, in a moving direction of the second frame when the display 151 is reduced, and accordingly, the electronic device 100 may generate a predetermined input signal. The electronic device 100 may control the driving part to reduce the display 151 based on the input signal.

For another example, the electronic device 100 may perform various functions, such as controlling the driving of the driving part or executing a specific application, when a repetitive shaking input is generated to the electronic device 100 regardless of the operation of the existing driving part.

Figure 6A:
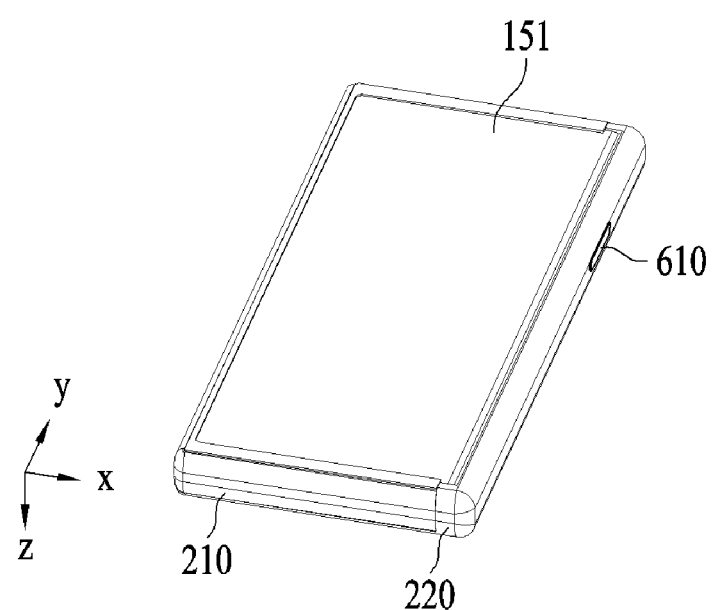
FIG. 6A is a perspective view of an electronic device according to an example embodiment of the present disclosure.
Figure 6B:
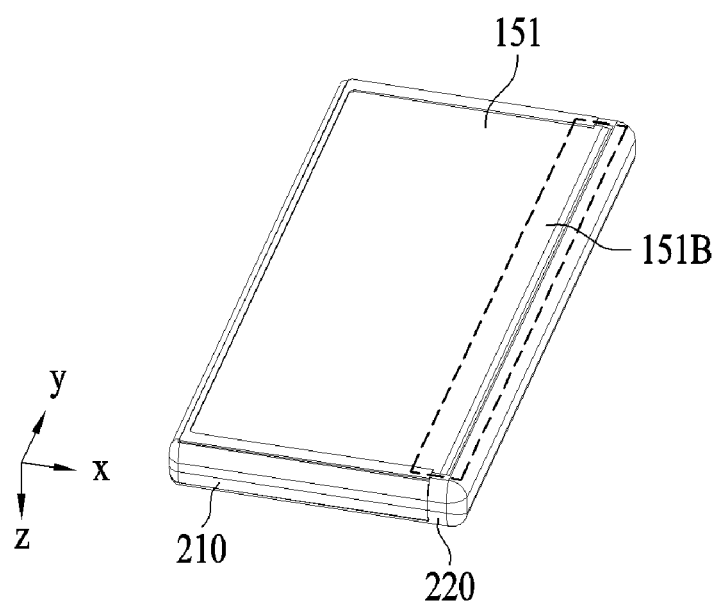
FIG. 6B is a perspective view of an electronic device according to an example embodiment of the present disclosure.

FIGS. 6a and 6b are perspective views of an electronic device according to various example embodiments.

The electronic device 100 may include a button part 610 on one side, as illustrated in FIG. 6a. The electronic device 100 may acquire (or receive) the input signal described with reference to FIG. 5a through the button part 610. In an example embodiment, the button part 610 may be provided to correspond to the position of a user's thumb.

Further, as illustrated in FIG. 6b, the electronic device 100 may not include the predetermined button part 610.

The electronic device 100 according to the various example embodiments may receive an input signal using a sensor provided inside the device, or may receive an input signal through a touch sensor provided on a side portion 151B of the display 151.

Figure 7A:
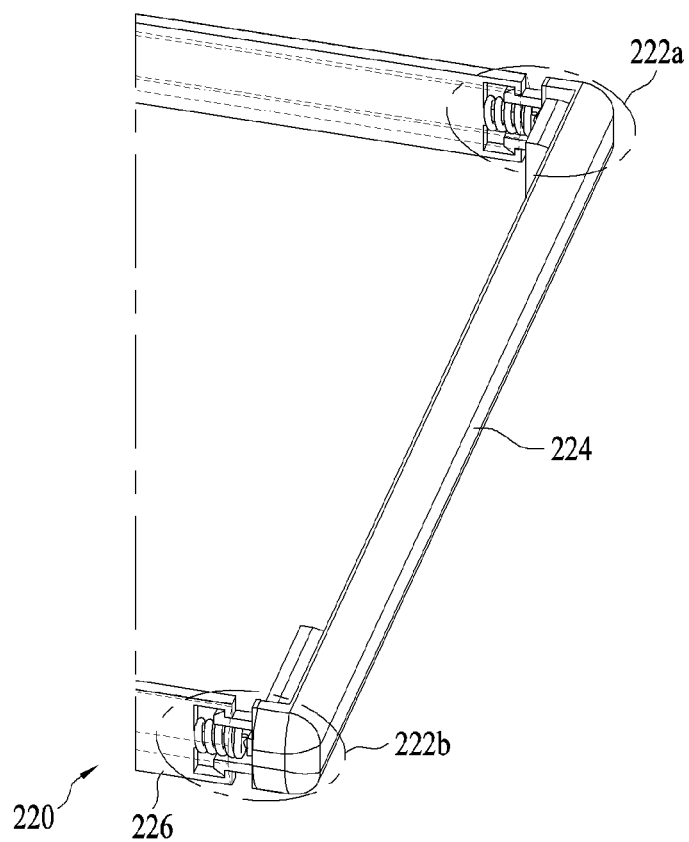
FIG. 7A is a diagram for illustrating a structure of a second frame according to an example embodiment of the present disclosure.
Figure 7B:
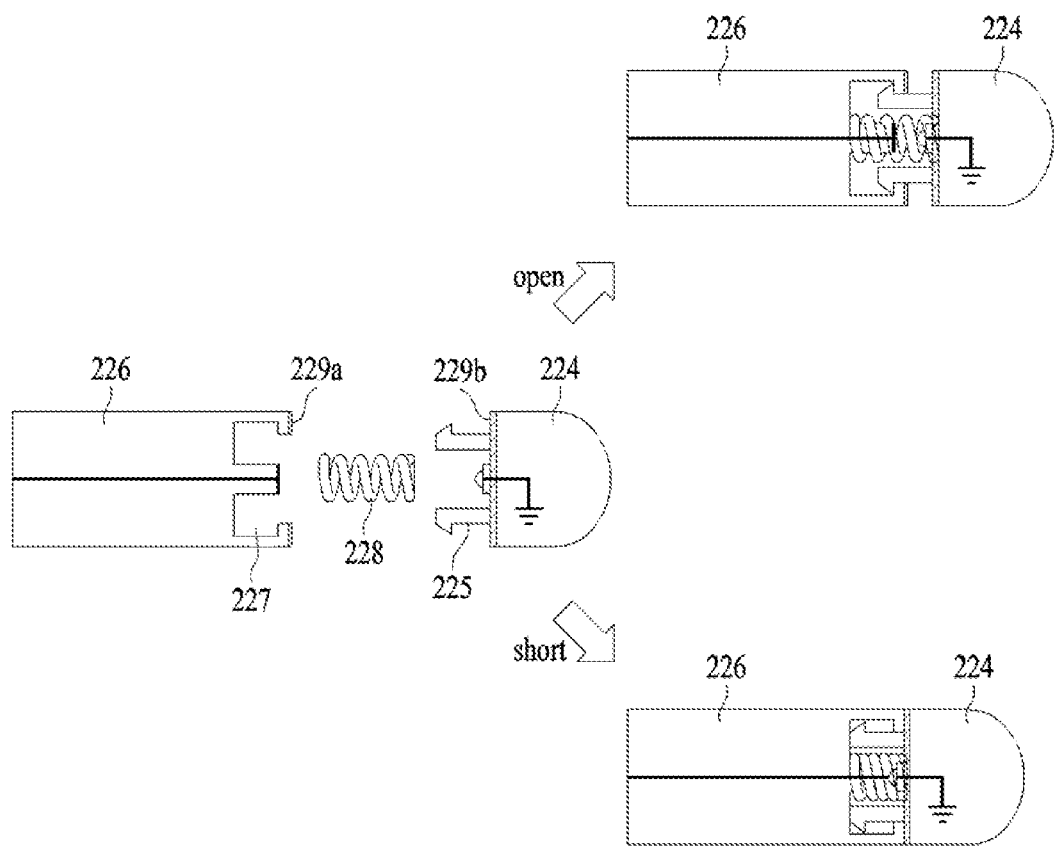
FIG. 7B is a view of explaining an operation of a bumper member according to an example embodiment of the present disclosure.

FIGS. 7a and 7b are diagrams for illustrating a structure of the electronic device 100 according to an example embodiment.

Referring to FIGS. 7a and 7b, the electronic device 100 according to various example embodiments may include a bumper member 224 at one side of the second frame 220.

For example, the bumper member 224 may be positioned on a side portion of the second frame 220 such that the second frame 220 faces a direction opposite to that of the first frame 210.

The bumper member 220 may be connected to a side frame 226 forming upper and lower sides of the second frame 220 with an elastic member 228 interposed therebetween. The number member 220 may be provided to generate to a designated input signal to the electronic device 100 when pressed by an external force, and may function as a bumper through the elastic member 228 to protect internal components of the electronic device 100 from external impact.

According to the various example embodiments, the electronic device 100 may generate an input signal according to whether an upper portion 222a and a lower portion 222b of the bumper member 224 are pressed. When the bumper member 224 is in contact with the side frame 226 as the bumper member 224 is pressed, the upper portion 222a and the lower portion 222b may include a circuit configuration capable of generating an input signal. The electronic device 100 may recognize an input signal generated when only the upper portion 222a of the bumper member 224 is pressed, an input signal generated when only the lower portion 222b is pressed and an input signal generated when both of the upper portion 222a and the lower portion 222b are pressed, as different types of input signals, and the electronic device 100 may perform different functions according to the types of the input signals.

According to an example embodiment, when the upper portion 222a and the lower portion 222b are pressed together, the electronic device 100 recognize it as a situation where the electronic device 100 is collided with an external object, and may control to temporarily stop an operation of the driving part.

The bumper member 224 may include a protruding part 225 at an end portion facing the second frame 220, and the bumper member 224 may be mechanically coupled to a groove portion 227 formed at an end of the side frame 226. Further, an end surface 229a of the side frame 226 and an end surface 229b of the bumper member 224 may include a buffer member for minimizing an impact when in contact with each other.

Although exemplary embodiments of the present disclosure have been described for illustrative purposes, those skilled in the art will appreciate that various modifications, additions, and substitutions are possible, without departing from the essential characteristics of the disclosure. Therefore, exemplary embodiments of the present disclosure have been described for the sake of brevity and clarity. Accordingly, those skilled in the art will understand the scope of the disclosure is not limited by the explicitly described above embodiments but by the claims and equivalents thereof.

What is claimed is:

1. An electronic device, comprising:
   a flexible display;
   a frame part configured to support the flexible display and comprise a first frame and a second frame disposed to be slidable with respect to the first frame;
   a driving part configured to change a shape of the flexible display based on a relative position between the first frame and the second frame; and a controller configured to:
- determine whether the shape of the flexible display is being changed;
- in response to determining that the shape of the flexible display is being changed, determine whether an input signal is received while the shape of the flexible display is changed, and
- in response to reception of the input signal, control the driving part to expand or reduce a space of the flexible display facing a first surface of the electronic device based on a type of the input signal.

2. The electronic device of claim 1, wherein changing the shape of the flexible display comprises expanding or reducing the space of the flexible display facing the first surface of the electronic device.

3. The electronic device of claim 2, wherein the driving part is configured to expand or reduce the space of the flexible display facing the first surface by moving a position of an area in which the flexible display is rolled, folded or bent.

4. The electronic device of claim 1, wherein the type of the input signal is an input signal generated according to a motion to the electronic device.

5. The electronic device of claim 1, wherein the controller is further configured to:
- acquire temperature information of the electronic device by using at least one sensor, and
- based on whether the temperature information is within a designated range, control the driving part to expand or reduce the space of the flexible display facing the first surface of the electronic device.

6. The electronic device of claim 1, wherein the controller is configured to:
- based on the input signal being received while the space of the flexible display facing the first surface is expanded, control the driving part to reduce the space; and
- based on the input signal being received while the space is reduced, control the driving part to expand the space.

7. The electronic device of claim 1, wherein the second frame further comprises a bumper member on a side facing in a direction opposite to the first frame.

8. The electronic device of claim 7, wherein the type of the input signal is an input signal related to pressure on the bumper member.

9. The electronic device of claim 8, wherein the controller is configured to perform an operation corresponding to a position pressurized on the bumper member.

10. The electronic device of claim 1, wherein the type of the input signal is an input signal received through at least one of a sensor, a mechanical key or a partial area of the flexible display, provided in the electronic device.

11. The electronic device of claim 1, wherein the type of the input signal is an input signal related to a collision of the electronic device.

12. An electronic device, comprising:
- a flexible display;
- a frame part comprising a first frame configured to support at least a portion of the flexible display and a second frame configured to move relative to the first frame based on changing a shape of the flexible display; and
- a controller configured to:
  - determine whether the shape of the flexible display is being changed;
  - in response to determining that the shape of the flexible display is being changed, determine, by at least one sensor, whether an input signal is received while the shape of the flexible display is changed, and
  - perform a function related to the changing the shape of the flexible display based on whether the input signal is received.

13. The electronic device of claim 12, wherein the controller is configured to control the driving part to stop changing the shape of the flexible display or to expand or reduce a space of the flexible display facing a first surface of the electronic device, based on a type of the input signal.

14. The electronic device of claim 13, wherein the controller is configured to acquire temperature information of the electronic device by using the at least one sensor, and based on whether the temperature information is within a designated range, perform a function corresponding to the type of the input signal.

15. The electronic device of claim 13, wherein the frame part is further includes a bumper member forming one side of the electronic device,
wherein the type of the input signal is an input signal generated according to pressure on the bumper member.

* * * * *